United States Patent
Schutzbach et al.

(10) Patent No.: US 6,807,494 B2
(45) Date of Patent: Oct. 19, 2004

(54) SEWER FLOW MONITORING METHOD AND SYSTEM

(75) Inventors: James S. Schutzbach, Madison, AL (US); Patrick L. Stevens, Indianapolis, IN (US)

(73) Assignee: ADS Corporation, Huntsville, AL (US)

(*) Notice: Subject to any disclaimer, the term of this patent is extended or adjusted under 35 U.S.C. 154(b) by 55 days.

(21) Appl. No.: 10/092,950

(22) Filed: Mar. 8, 2002

(65) Prior Publication Data
US 2002/0173923 A1 Nov. 21, 2002

Related U.S. Application Data
(60) Provisional application No. 60/274,839, filed on Mar. 9, 2001.

(51) Int. Cl.[7] .............................. G01F 1/00; G01F 7/00
(52) U.S. Cl. ..................................................... 702/45
(58) Field of Search ........................... 702/45, 50, 100, 702/179, 181; 73/196, 861

(56) References Cited

U.S. PATENT DOCUMENTS

| 4,211,111 | A |   | 7/1980 | Petroff ....................... 73/195 |
| 4,397,191 | A |   | 8/1983 | Forden ...................... 73/861.25 |
| 4,630,474 | A |   | 12/1986 | Petroff ....................... 73/196 |
| 5,198,989 | A |   | 3/1993 | Petroff ....................... 702/48 |
| 5,821,427 | A |   | 10/1998 | Byrd ......................... 73/861.25 |
| 5,942,698 | A | * | 8/1999 | Stevens ..................... 73/863.03 |
| 2002/0156590 | A1 | * | 10/2002 | Schutzbach et al. .......... 702/45 |
| 2002/0170350 | A1 | * | 11/2002 | Schutbach .................. 73/195 |

FOREIGN PATENT DOCUMENTS

| DE | 3720345 A1 | 12/1988 |
| DE | 4333095 A1 | 3/1995 |
| EP | 0 105 229 | 4/1984 |

OTHER PUBLICATIONS

English Abstract for EP 0105229 for Heidi Gerhard, Apr. 11, 1984, p. 1, esp@cenet database–12.

* cited by examiner

Primary Examiner—Michael Nghiem
(74) Attorney, Agent, or Firm—Gilberto M. Villacorta; James A. Gromada; Katten Muchin Zavis Rosenman (57) ABSTRACT

A method and system for monitoring and analyzing flow in a sewer system includes the steps of using a monitoring assembly to collect data representative of actual flow volume of a fluid substance in a first location such as a sewer pipe, storing the actual flow volume data in a memory, maintaining previously stored data in the memory, determining a predicted flow volume and comparing the actual flow volume with the predicted flow volume to yield a difference value. The predicted flow volume is dependent on the data selected from the previously stored data and a day and time that corresponds to both the actual flow volume data and the data selected from the previously stored data. The predicted flow volume may also be dependent upon additional data corresponding to a rain event.

26 Claims, 11 Drawing Sheets

SEWER FLOW MONITORING METHOD AND SYSTEM

CROSS-REFERENCE TO RELATED APPLICATIONS

This application claims priority under 35 U.S.C. §119(e) to U.S. Provisional Application Serial No. 60/274,839, entitled "Sewer Flow Monitoring Method and System", filed Mar. 9, 2001, the contents of which are incorporated herein by reference.

BACKGROUND OF THE INVENTION

1. Field of the Invention

The present invention relates generally to sewage flow monitoring systems. More particularly, the present invention relates to a method and system of monitoring the flow of a fluid substance to detect flow loss based on a predicted flow volume.

2. Description of the Related Art

Fluid flows in pipes and open channels are common in numerous industrial, commercial, municipal, and residential systems. Proper and efficient operation of these systems, and meaningful planning for future expansion and maintenance of such systems, depends upon accurate measurement of the flow that passes through such systems. Sewer systems, such as municipal sanitary sewer systems, are an example of one system in which accurate flow measurement is critical.

Many sewer flow measuring devices operate by detecting both the depth of flow in a channel or pipe and the velocity of the flow in the same location of channel of pipe. The data is collected at periodic sampling times and is used to calculate a flow rate. Examples of such flow measurement devices are disclosed in U.S. Pat. No. 4,397,191, to Forden; U.S. Pat. No. 4,630,474, to Petroff; and U.S. Pat. No. 5,198,989, to Petroff, each of which is incorporated herein by reference in its entirety. In the wastewater industry, real-time detection of problem events and accurate prediction of future system operation have become increasingly important. Real-time detection of system problems, such as leaks or system breaks, sanitary sewer overflows, and system blockages, allows system managers to quickly respond to such problems. With a rapid response, system managers can prevent or minimize unwanted incidents such as basement back-ups or sewage in waterways that may result from system overflows or breaks. For example, with early detection of a system blockage, managers could respond to and clear the blockage or repair the pipe before it causes an overflow or a buildup of pressure within the system resulting in a break or leak. Further, if an overflow occurs, such as may happen during a storm event, system managers can take action to redirect the flow to other channels within the system in order to reduce or eliminate the overflow condition.

Further, a system with predictive capabilities could allow managers to stop overflows before they occur, to more effectively use existing system features, and identify and plan for required system expansions.

Conventional monitoring systems have exhibited several problems. The conventional systems are limited to reporting of data and basic alarming. Such systems do not reliably validate, in real time, monitored data. Further, alarm conditions are typically triggered based on predetermined levels, and the monitoring systems are susceptible to false alarms during storm conditions, holidays, and other unusual events that are not necessarily reflective of a sewer system problem. Further, the conventional monitoring systems lack reliable predictive capabilities for predicting flow at various points in a sewer system.

Accordingly, it is desirable to provide an improved method and system for monitoring flow in a sewer system.

SUMMARY OF THE INVENTION

It is therefore a feature and advantage of the present invention to provide an improved flow monitoring method and system.

In accordance with one embodiment of the present invention, a method of monitoring and analyzing flow in a sewer system includes the steps of using a monitoring assembly to collect data representative of actual flow volume of a fluid substance in a first location such as a sewer pipe, storing the actual flow volume data in a memory, maintaining previously stored data in the memory, determining a predicted flow volume and comparing the actual flow volume wit the predicted flow volume to yield a difference value. The predicted flow volume is dependent on the data selected from the previously stored data and a day and time that corresponds to both the actual flow volume data and the data selected from the previously stored data. Optionally, the predicted flow volume may also be dependent upon additional data corresponding to a rain event.

In situations where the difference value exceeds a predetermined variance value, the method may further include the step of issuing a flow loss notification. If the difference value does not exceed a predetermined variance value, the method may also include storing the actual flow volume in the memory as stored calibration data. As additional options, the method may include the additional step of transmitting the flow velocity data, depth data, and/or the actual flow volume over a data network such as the Internet to a computing device. Also optionally, the actual flow volume may be a rolling average flow volume.

As additional options, at least one of the determining step and the comparing step may be performed by the monitoring assembly. In the alternative, the determining step and/or the comparing step may be performed by the computing device. As a further option, the method may include the additional step of validating the data representative of flow velocity and depth. In such a case, the validating step may optionally be performed by the monitoring assembly. In addition, the data representative of actual flow volume may include at least one of flow velocity data and depth data, and the method may include calculating the flow volume based upon such data.

In accordance with an additional embodiment of the present invention, a flow monitoring system includes a first monitoring assembly having at least one sensor. The sensor operates to collect data representative of actual flow volume at a first location. The system also includes a processor and a memory. The memory operates to store the data representative of flow volume as well as a detection time associated with the data. The system also includes a central computing device in communications with the first monitoring assembly. The processor is trained to compare the actual flow volume with a predicted flow volume to yield a difference value. The predicted flow volume is dependent on the data stored in the memory and the detection time associated with such data.

Optionally, the processor is further trained to issue a notification if the difference value exceeds a predetermined variance value. Also, the data representative of actual flow volume may include depth data and/or velocity data, and the processor would be further trained to calculate the actual flow volume corresponding to such data.

As an additional option, the processor may be integral with the first monitoring assembly. As an alternative option, the processor may be integral with the central computing device.

Also in accordance with this embodiment, a first monitoring assembly may optionally be capable of validating the flow velocity in depth. As an additional option, the system may include a second monitoring assembly that has a means for detecting the quantity of rain at a location during a period of time, such as a rain gauge, a weather service, or even a weather web site. Further, the central computing device may be trained to predict an anticipated flow velocity, depth, and/or flow volume of the fluid substance at a second location.

BRIEF DESCRIPTION OF THE DRAWINGS

FIG. 9 is a block diagram that illustrates data validation features of the present invention.

DETAILED DESCRIPTION OF THE INVENTION

Figure 1:
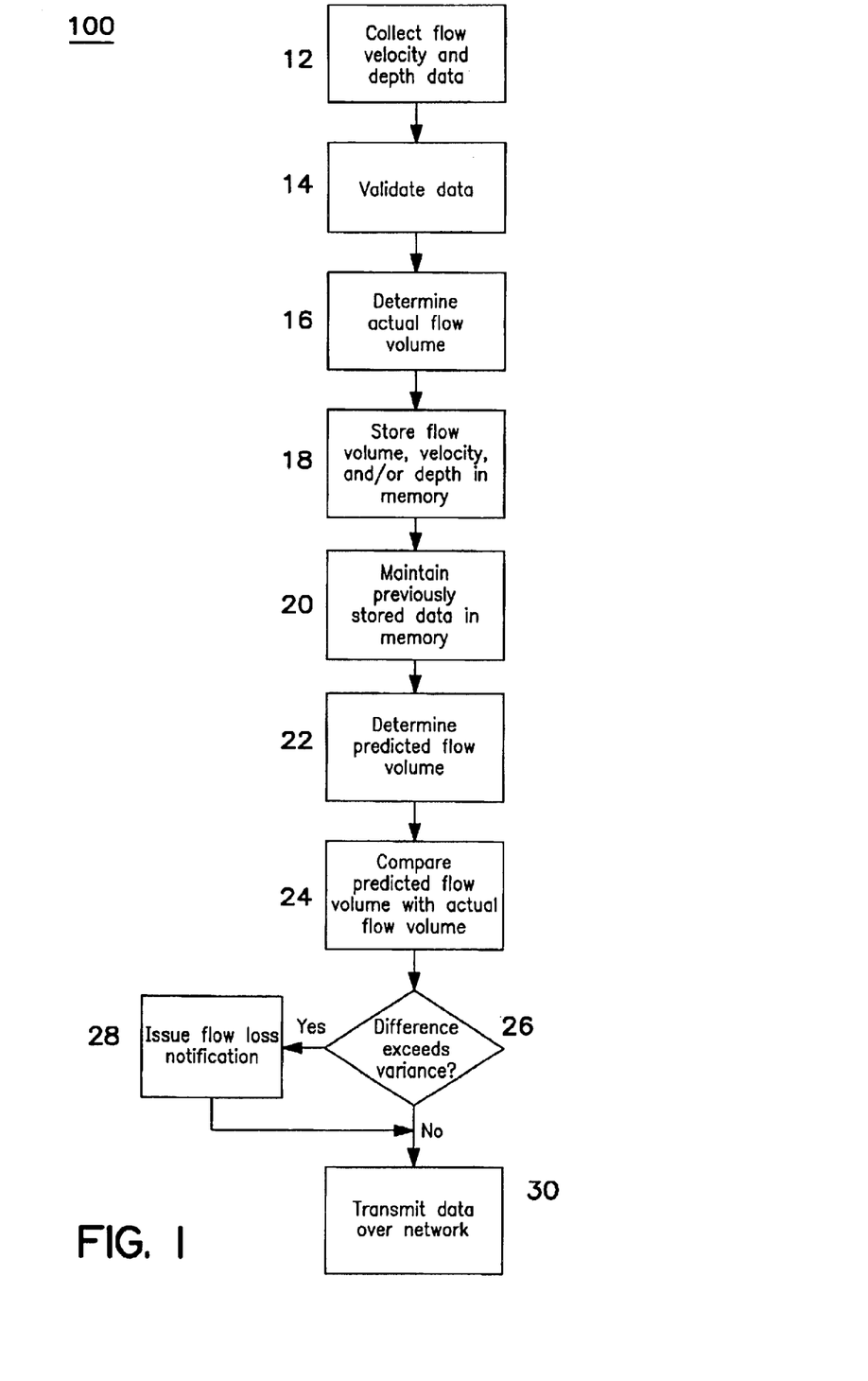
FIG. 1 is a flow chart illustrating the steps that maybe followed in an embodiment of the present invention as a method.

The present invention provides a novel sewer flow monitoring method and system. A flow chart 100 of the present invention in a method embodiment, and the potential steps to be implemented by a system embodiment, are illustrated in FIG. 1. Referring to FIG. 1, the method includes the step of using a monitoring assembly to collect 12 data representative of flow velocity in depth of the fluid substance in a first sewer location. This data may be collected by velocity and depth sensors that are integral with the monitoring assembly, such as those described in col. 2 of U.S. Pat. No. 4,397,191, to Forden (including the drawings referenced therein), and col. 2 of U.S. Pat. No. 5,821,427, to Byrd (including the drawings referenced therein), each of which is incorporated herein by reference.

The method also includes determining a flow volume 16 corresponding to the flow velocity and depth detected. The flow volume may be determined by any appropriate method, such as simply by multiplying the flow velocity and the depth to result in a volume, or by using methods that consider additional variables such as temperature as described for example in U.S. Pat. No. 5,198,989, to Petroff, which is incorporated herein by reference in its entirety.

The steps of detecting a flow velocity and depth and determining a flow volume are preferably performed in the monitoring assembly itself. In such an embodiment, the monitoring assembly would include a processor and a memory, and the processor would be trained, such as through computer program instructions or digital logic, to perform the calculation of flow velocity. Optionally, the flow velocity and depth data may be transferred to a remote or central computing device over a communications network such as the Internet, and the determination of flow velocity may be performed by the remote or central computing device. The processes of detecting flow velocity and depth and calculating flow volume are periodically repeated, such as may occur during one-minute intervals, fifteen-minute intervals, or any regular or irregular interval that is desired. The flow velocity data, depth data, and flow volume data are stored in a memory 18. In the embodiment where the flow volume is determined at the monitor level, the memory 18 is preferably integral with the monitor. In the embodiment where the flow volume is determined at the computer, the memory 18 is preferably integral with the computer. The memory 18 maintains stored data 20 over a period of time, although optionally data may be discarded after it achieves a predetermined age, such as a week, a month, a year, or (such as many be desirable for data relating to unique days such as holidays) several years.

As an additional option, in step 12 only one of flow velocity and depth data may be obtained. For example, flow volume could be calculated as a function of either depth or velocity, without need for collecting the other data item. Further, in an optional embodiment, step 12 may be completely eliminated and the system may directly collect flow volume data, such as when data from a pump station or other area is available.

Optionally, the method may include validating 14 the flow volume and/or depth data before determining the flow volume, or it may include validating 14 the flow volume data after it is determined or calculated. In a preferred embodiment, using depth data for purposes of discussion, the validation is performed by comparing the detected depth with previously-collected depth data stored in the memory. The validation step considers the time that the data is collected, and preferably the day that the data is collected, and compares it to data previously collected for similar days and times. For example, the system may collect depth data at 8:00 a.m. on a weekday, and the validation step will include comparing that data to depth data collected at or near 8:00 a.m. on previous weekdays. Similarly, weekend days may correspond, and the system may also optionally be programmed to recognize, holidays (which typically have unique flow trends) and/or individual days within the week, such as Mondays, Tuesdays, etc.

The comparison may be done to the most recent relevant previously-collected data, or it may be to a set of previous data. Preferably, the previously-collected data is limited to that collected recently, such as during the past ten related days and times, so that trends are followed and gradual changes do not result in false determinations of invalidity. Optionally, the previously-collected data may be averaged, or a mean may be calculated for comparison purposes. Optionally, the average may be a weighted average, such that the most recent data is given the most weight, while older data is given less weight. If the current depth data differs from the previous data by more than a predetermined variance level, then the system assumes that the data is invalid, and the monitor is re-fired to collect another set of data The predetermined variance level may be any amount, such as a percentage or a set number, and is preferably set to be large enough to avoid false invalidity determinations and small enough to capture most invalid readings. After re-firing, the system may perform the validation step again. Optionally, if a predetermined number of re-firings yield similar results, the system will presume that the data is valid.

Preferably, the validation step is performed at the monitor level, but optionally and alternatively the validation may be performed by the remote or central computer.

Returning to FIG. 1, the system includes the feature of detecting flow loss by comparing the actual, detected flow volume with a predicted flow volume. First, the system determines a predicted flow volume 22 based on the data representative of flow velocity and depth in that is previously stored in the memory. As with the validation feature described above, the predicted flow volume is determined based on the day and time of the current reading and comparing 24 it with readings taken at previous, related days and times. If the current reading falls below a predetermined threshold 26, such as 75% of the expected reading, an alarm may be issued 28.

Figure 2:
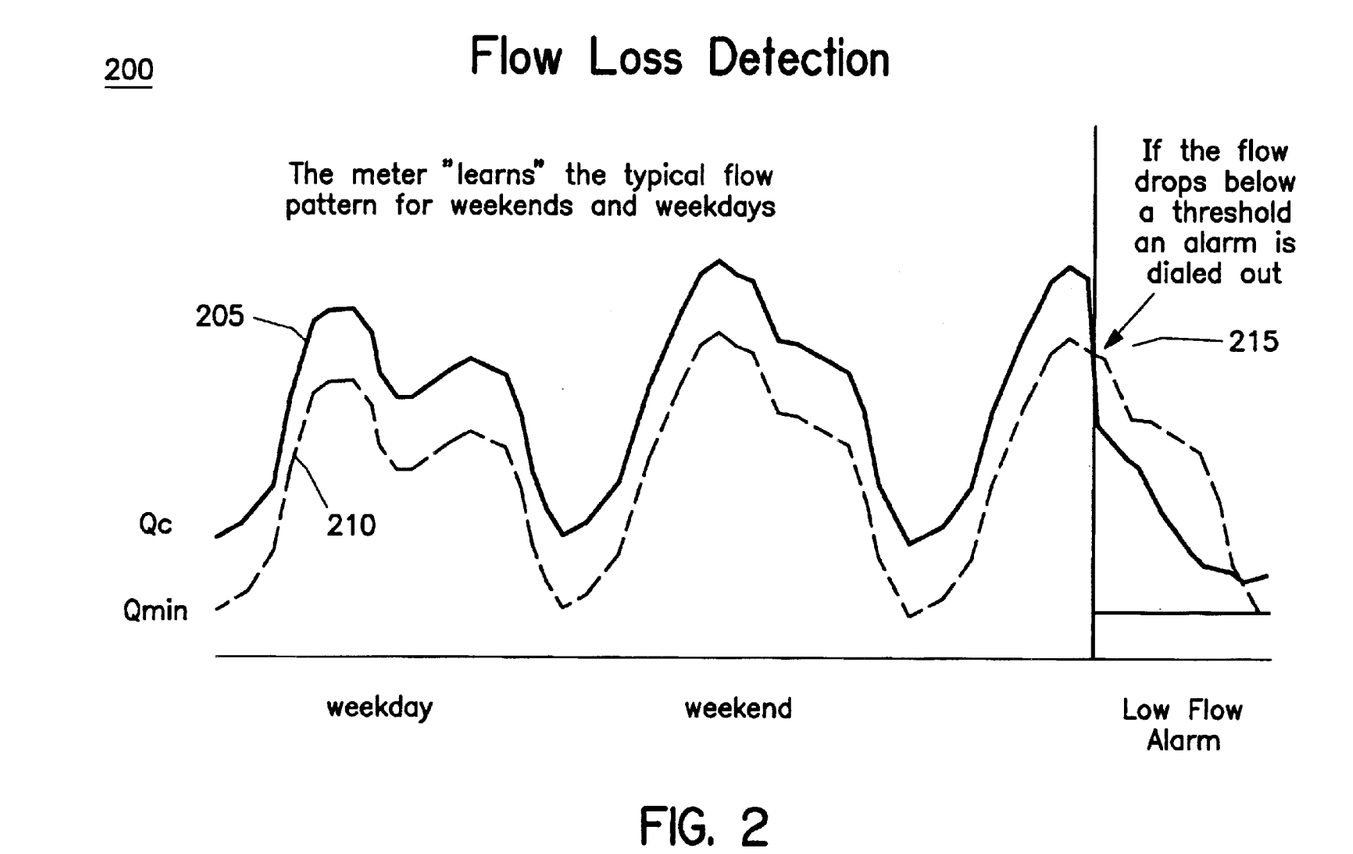
FIG. 2 illustrates an example of the operation of the flow loss detection feature of the present invention.

An illustration 200 of such a comparison is shown in FIG. 2, where the calculated velocity 205 is identified as $Q_C$ and the predetermined threshold 210, such as 75% of the predicted flow loss, is identified as $Q_{MIN}$. $Q_C$ and $Q_{MIN}$ typically vary over different days and times, as sewage flow on weekdays typically differs from that on weekends, and flows during different times of day also vary. For example, flows at 3:00 am. on a weekday are typically much lower than flows at 8:00 am. on a weekday. Trends associated with holidays or individual days may also be considered. As illustrated in FIG. 2, if the flow 205 drops below the predetermined threshold 210, an alarm is triggered 215. The alarm, as well as any or all of the data, may be transmitted to a remote or central computer over a communications network, as illustrated by step 30 in FIG. 1.

Figure 3:
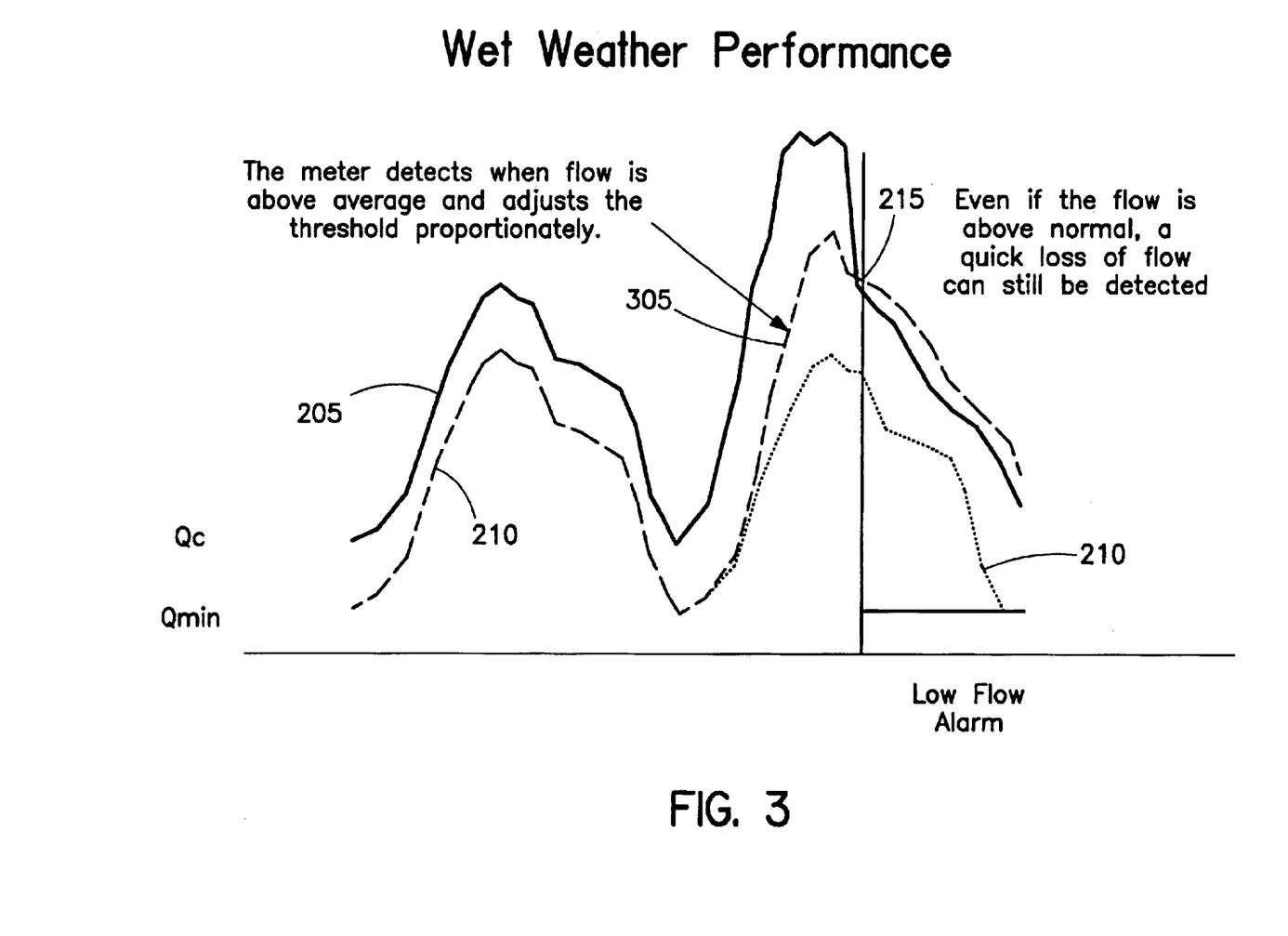
FIG. 3 further illustrates the flow loss detection feature.

FIG. 3 illustrates that the method may include compensation for wet weather. For example, FIG. 3 illustrates that when the system detects a gradual increase in flow volume or a gradual decrease in flow volume, the system may presume that the increase or decrease results from a storm event. In such a situation, a quick loss is identified 305 as an actual flow loss, while a gradual decrease is identified as an end of a storm event. Optionally, the system may use actual data collected from one or more rain gauges, or even data obtained from a weather service or weather web site, to determine when a storm event is occurring.

Figure 4:
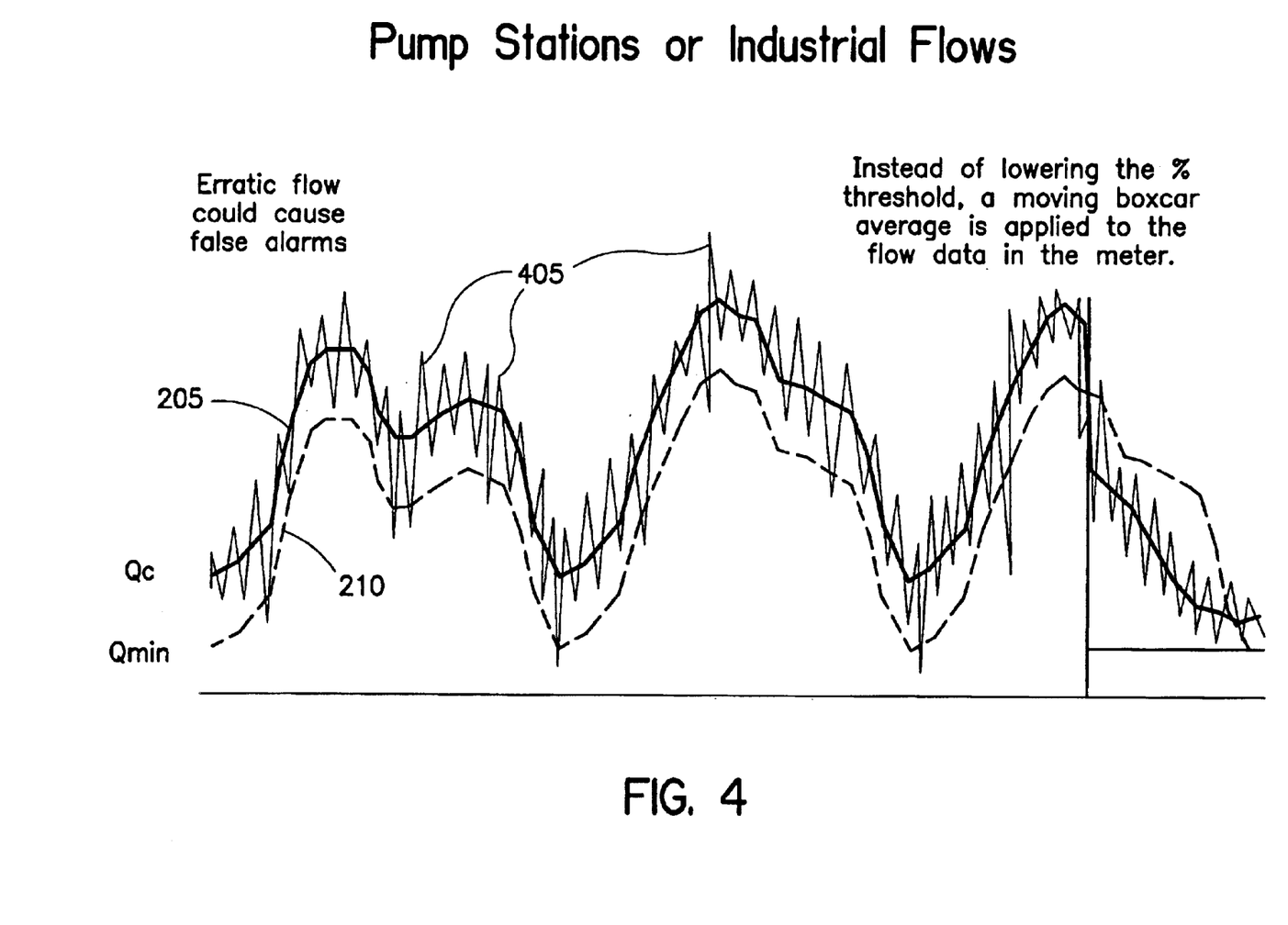
FIG. 4 further illustrates the flow loss detection feature.

FIG. 4 illustrates that the predetermined threshold 210 is preferably set at a level that is not too close to the actual readings in order to avoid false alarms. For example, starts and stops of pump stations in a sewer system can cause spikes and/or erratic flows 405. Thus to avoid a change and pump status causing a false alarm, the predetermined threshold 210 may be anywhere from 5% to 50% below the predicted value, or more or less as may be appropriate for the system. In addition, to avoid "spikes" 405, the actual flow volume 205 may be calculated on a "moving boxcar" or rolling average basis, such as by using the average of the previous two, ten, or any predetermined number of readings.

Figure 5:
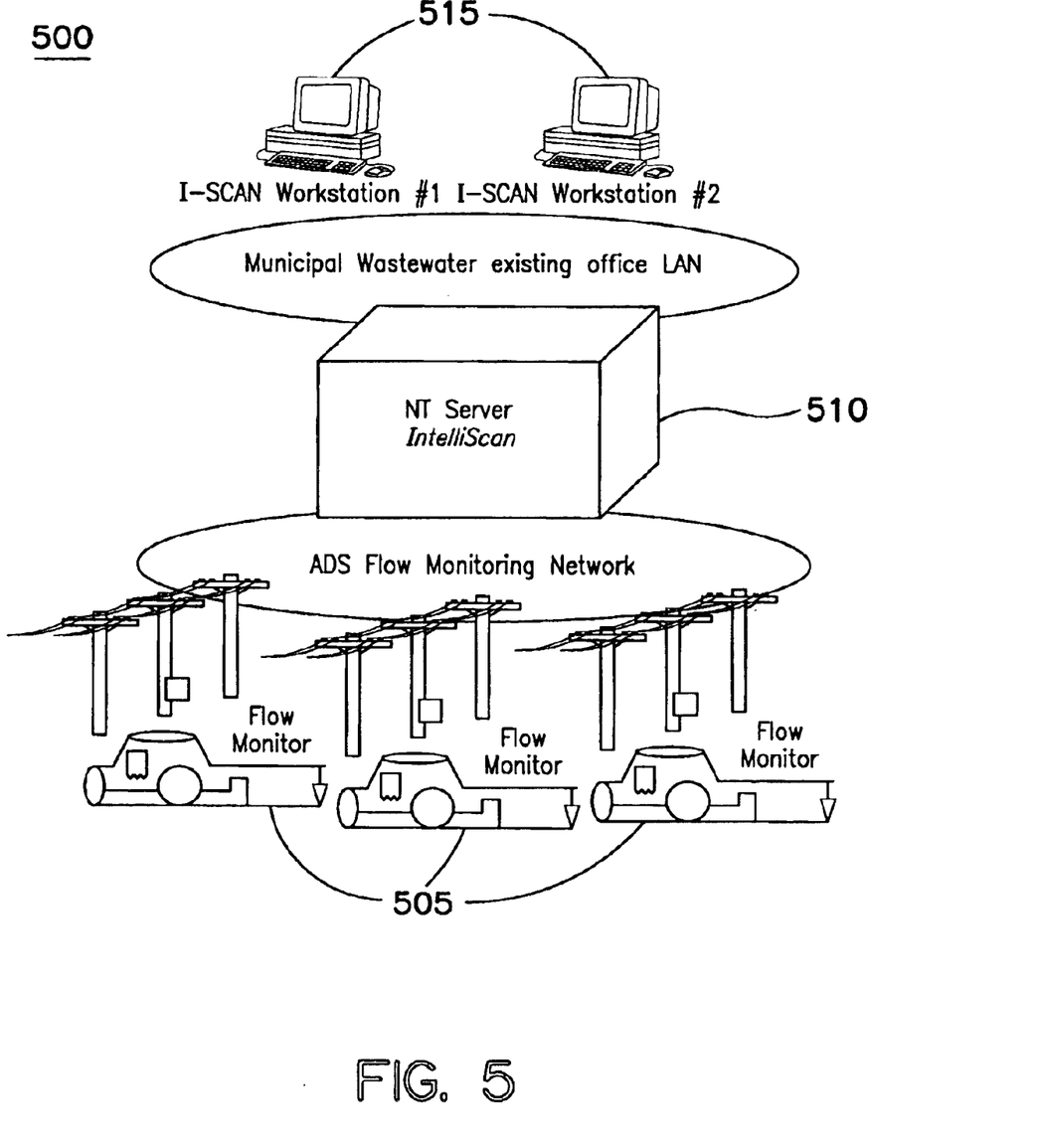
FIG. 5 illustrates examples of certain hardware aspects of the present system.
Figure 5A:
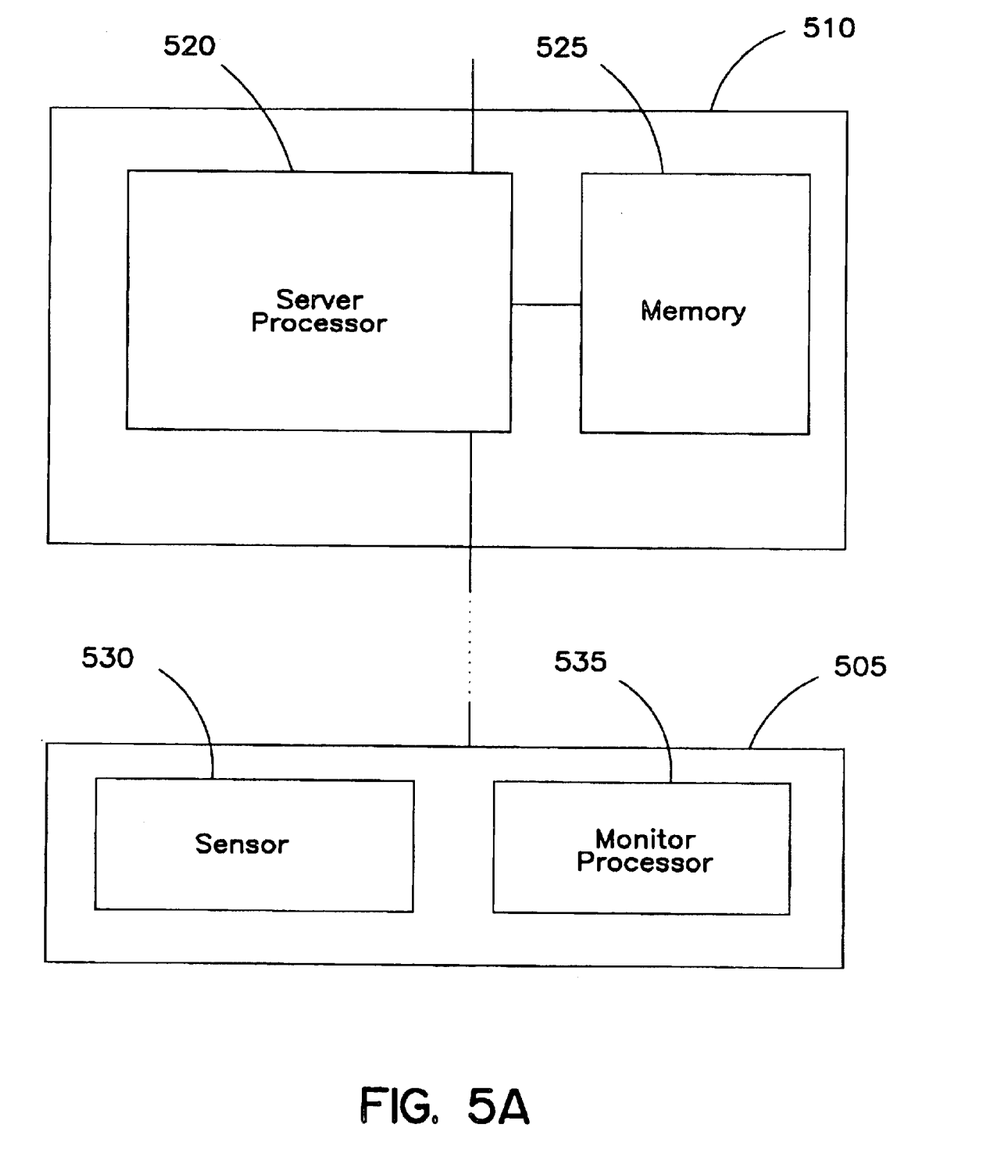
FIG. 5A is a block diagram illustrating further details of the system shown in FIG. 5.

FIG. 5 illustrates an example of several elements of the system embodiment 500 of the present invention. Referring to FIG. 5, a network of flow monitors 505 detects depth and velocity at various locations in a sewer system. Referring also to FIG. 5A, the flow monitors 505 each include a sensor 530 to perform the detections and a processor 535. The monitors 505 communicate with a central or remote server 510 over a data network such as a local area network, wide area network, or the Internet. The server 510 includes a processor 520 and a memory 525. Optionally, the central server 510 may also communicate with one or more user workstations 515 over a data network such as a local area network, wide area network, or the Internet. The system 500 may also be used to monitor or predict potential problems with a sewer system.

Figure 6:
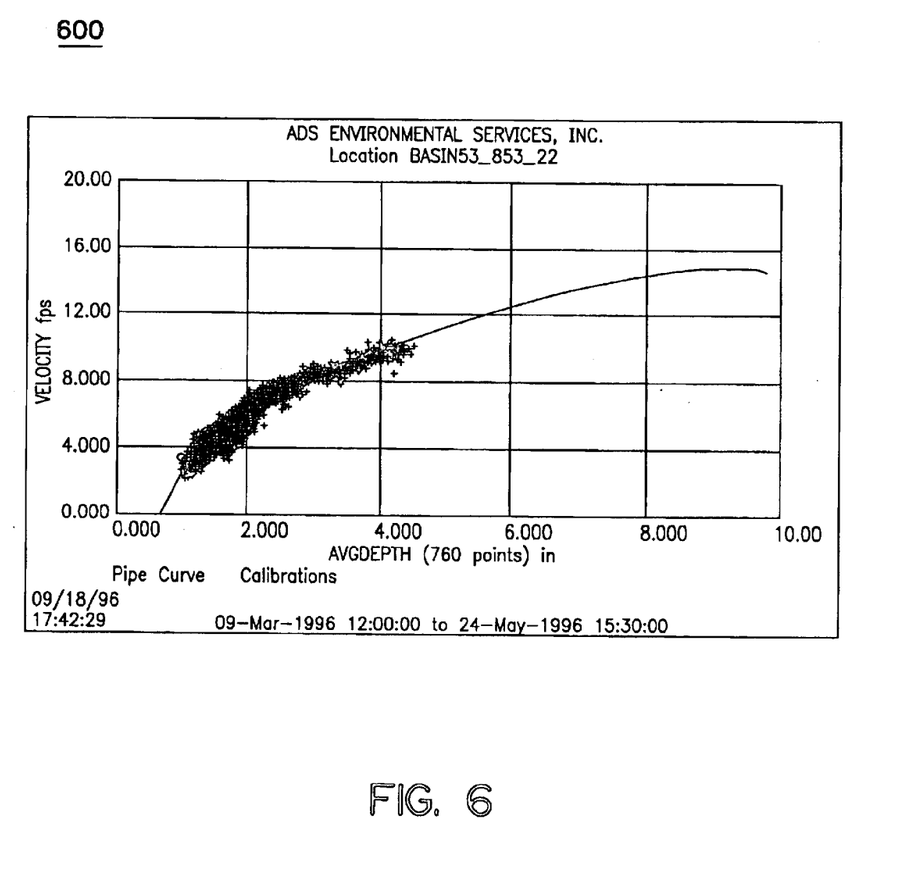
FIG. 6 is an exemplary scatterplot hydrograph in a normal pipe.

During the last century, several hydraulic engineers developed equations, known as pipe curve equations or hydraulic element curves, to describe the relationship between the depth of open channel gravity flow to the velocity of that flow. For a given depth of flow there is a unique and predictable velocity (and flow rate). FIG. 6 shows an exemplary scattergraph 600 from a normal open channel flow sewer. The plot of paired depth and velocity readings from an open channel flow meter should form a pattern similar to this pipe curve 600. Patterns that deviate from the expected pipe curve 600 indicate that either the hydraulics of the pipe are changing or the meter is malfunctioning.

Figure 7:
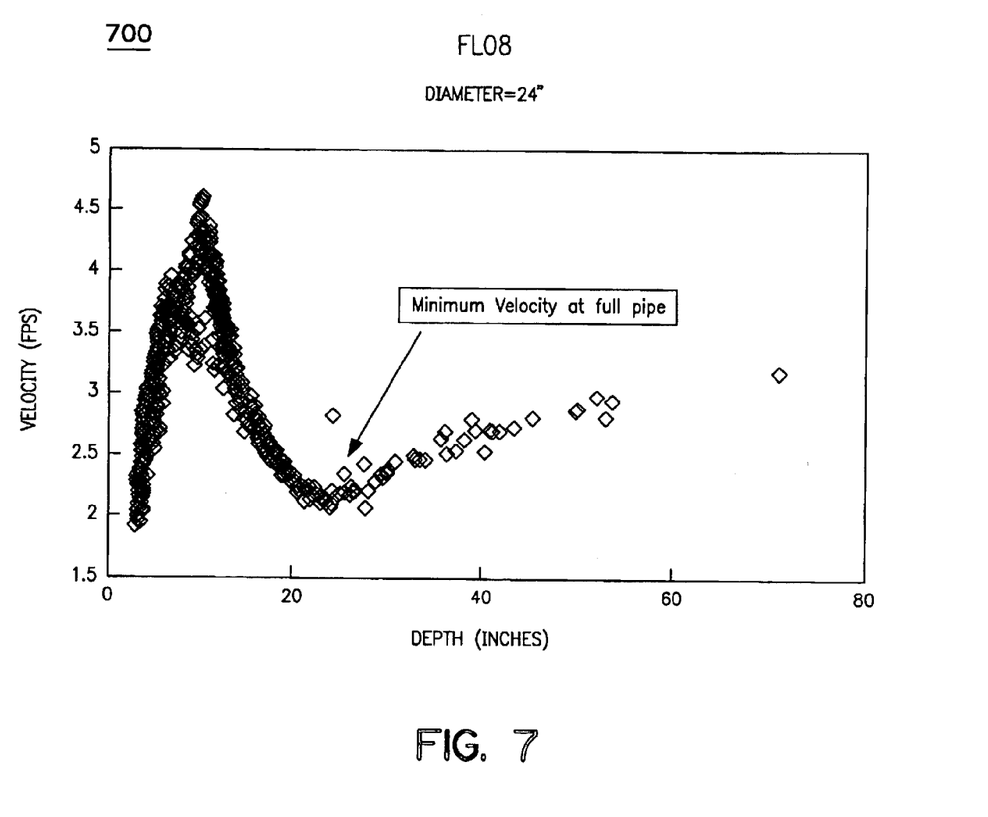
FIG. 7 is an exemplary scatterplot hydrograph in a blocked system.

It is a rare sewer system that produces an ideal scattergraph 600. Bottlenecks can be caused by undersized pipes, broken pipes, Toots and severe turns in manholes. FIG. 7 illustrates the classic "ski jump" shape 700 which is the distinguishing characteristic of a sewer with a downstream bottleneck The hydraulic grade line 700 in this example will become flat during the surcharge period and the backwater condition can be detected several manholes upstream of the bottleneck.

Figure 8:
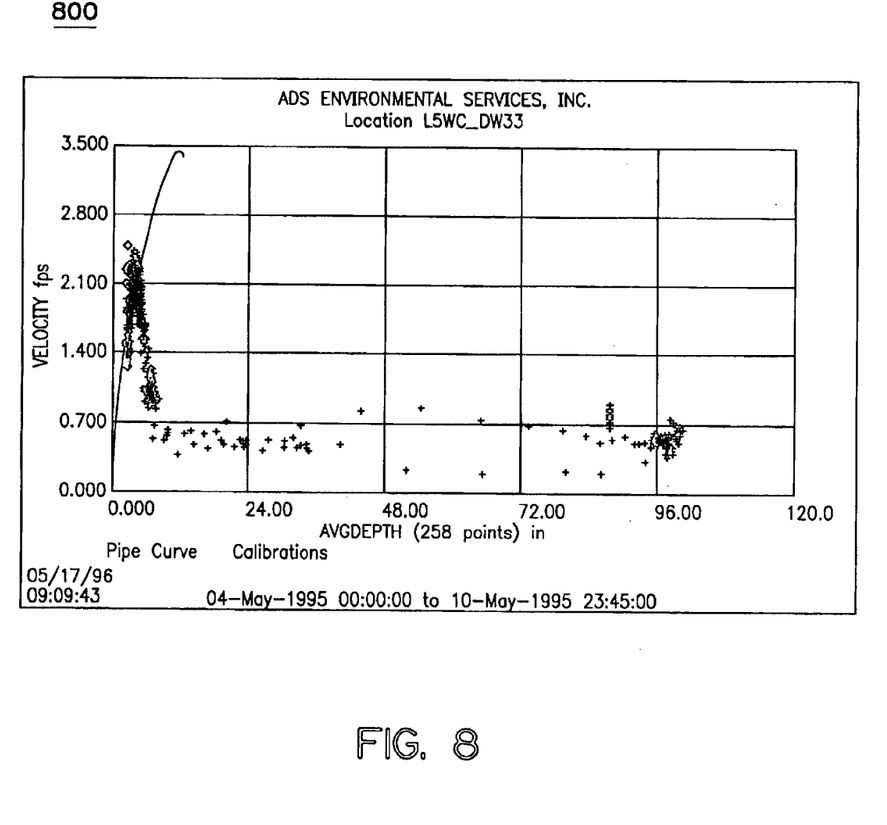

Sanitary sewer overflows (SSOs) are also a problem in many sewer systems. They are difficult to witness or document because they usually occur during rain events when people are indoors. Also, they frequently are located out of sight at the lowest manholes or structures along creeks and ravines. Toilet paper in the branches along the creek may be the only evidence that some SSOs leave behind. The first reaction to SS0's from casual observers and some collection system managers may be that they "need a bigger pipe." However, in whole or in part, many SSOs are caused by a downstream bottleneck. Thus, in such cases, bigger pipes may not be needed, and simple elimination of the bottleneck may solve the problem. SSOs and bottlenecks each will leave telltale evidence in the data of nearby flow meters. FIG. 8 is an exemplary scattergraph 800 produced by flow monitor data collected during an upstream SSO event.

Figure 9:
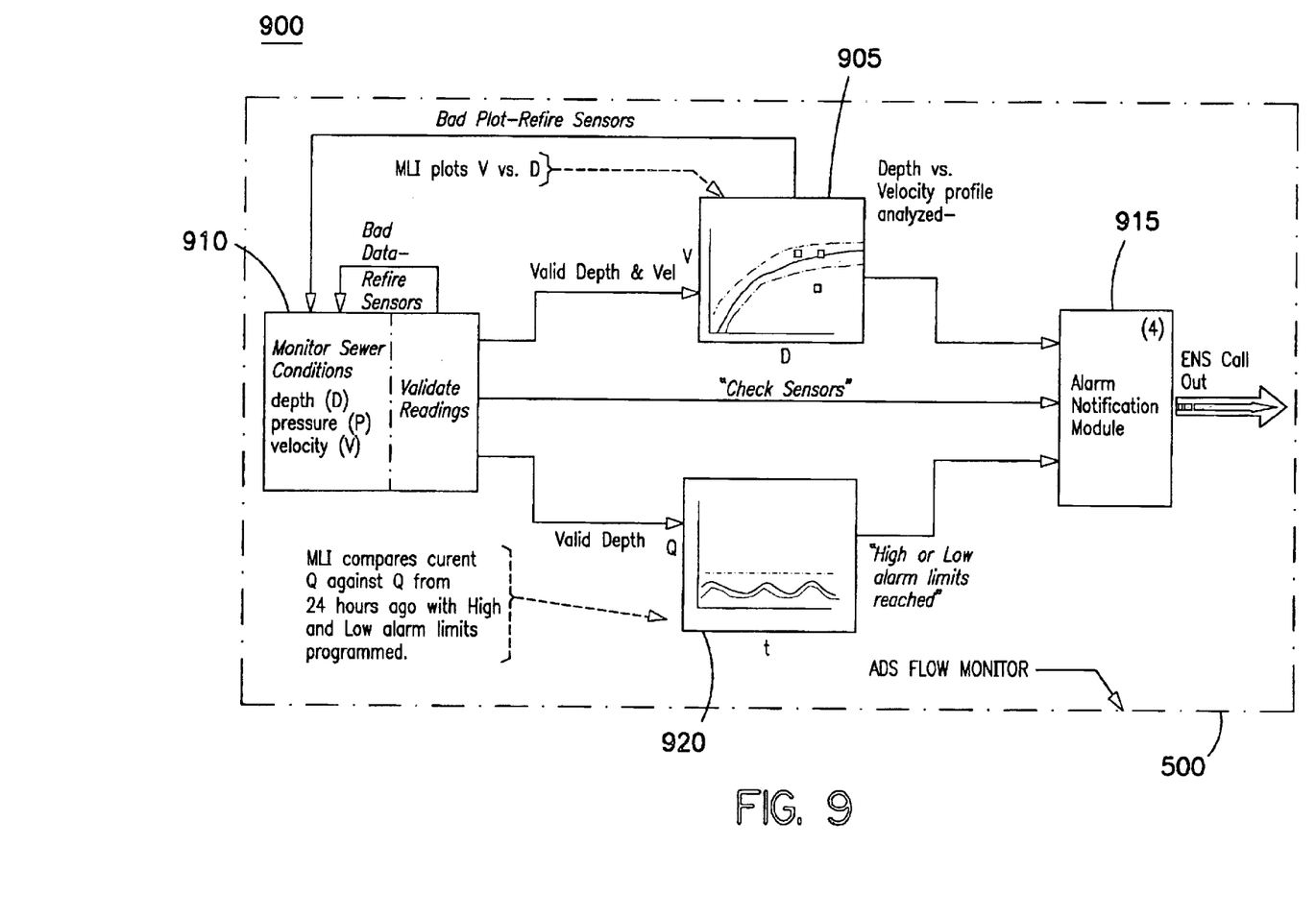
FIG. 9 is an exemplary scatterplot hydrograph in a system experiencing sanitary sewer overflow.

Referring to FIG. 9, a block diagram 900 illustrates how the present inventive method 100 and system 500 can use scatterplots to validate data and identify bottlenecks and SSOs. An optional "scatterplot feature" 905 compares valid depth and velocity data points to an expected hydraulic signature curve. If these data points do not fall within the expected hydraulic signature curve limits, the sensors are re-fired to collect new data at block 910 to test the validity of the data and verify whether a sensor may have malfunctioned. If depth and velocity data points are repeatable, it is assumed that the data is valid and it is stored. If they are not repeatable, they are flagged as "bad" data. If the verified data points fall outside of expected curve limits, the alarm notification module 915 initiates an event call out. An optional "hydrograph function" 920 compares valid depth data with previously-collected data, such as a "learned 24 hour" diurnal curve. The result of that comparison typically indicates a quantity above or below the expected diurnal curve at a specific time of day. Any quantity plots above or below the expected diurnal curve may result in an alarm event at block 915.

Figure 10:
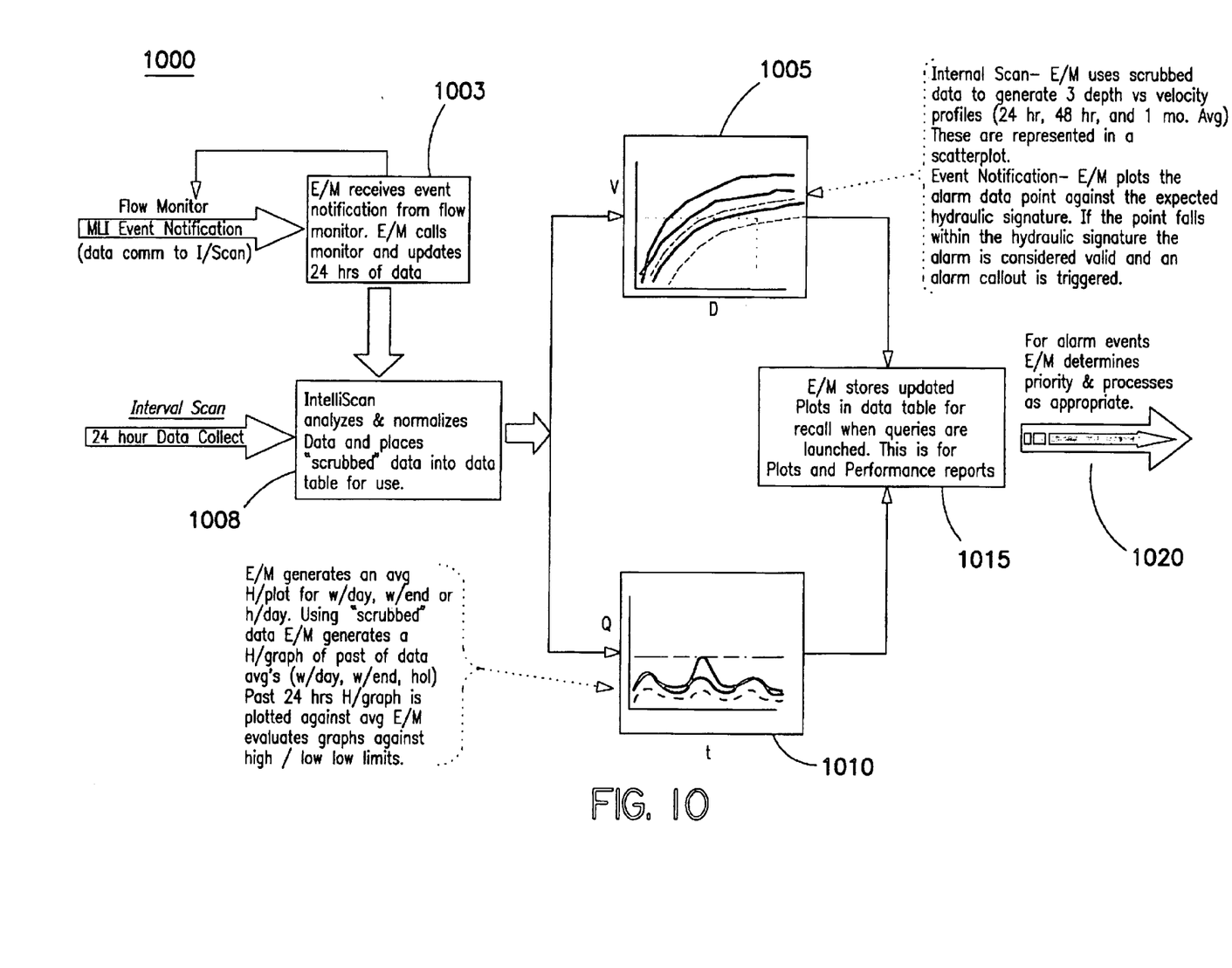
FIG. 10 is a block diagram that illustrates alarm event detection features of the present invention.

FIG. 10 is a block diagram 1000 that illustrates exemplary embodiments of features of event management in the present inventive method 100 and system 500. Upon receiving an event notification 1003 from a flow monitor 505, the system 500 may plot the event depth and velocity points against an expected hydraulic signature curve at block 1005. The expected hydraulic signature curve is generated using a 24 hour data collection, followed by analysis and normalization of the data at block 1008. If the event depth and velocity points fall inside a normal plot standard deviation, the system 500 considers the point to be valid. The system 500 may also plot the event depth points against an average weekday or weekend or holiday hydrograph at block 1010. Data is then saved in an event management store at block 1015. If an event depth point falls above or below the predetermined average daily hydrograph limits, the system 500 considers the event depth point to be invalid and may trigger an alarm and/or recollect the data at 1020. When triggered, an alarm is generated by an alarm device that is typically integral with a processor for example either the server processor 520 or a monitor processor 535. Optionally, if a predetermined number of alarms occurs in a set period (such as three alarms in an eight-hour shift), a high priority alarm may be triggered at 1020 in order to prompt a user of system manager to investigate the problem.

The system 500 includes several functions that a user may optionally see on a user display. For example, a log-on/log-offbutton may be provided to allow the user to log on and off the system. A system overview button may allow the user to select a graphic view of the system that provides an overview of a geographic area, such as a county or river basin. The user may be provided with a select topic button that allow the user to select an area, such as a county or basin, or an individual site. Alarm summaries and communications summaries may also be made available to the user. Optionally, a weather button may allow the user to view weather data, such as that collected by rain gauges or even as obtained from a weather service or weather web site. A site detail screen may allow the user to see real-time monitor data as well as scatterplots and time-lapse data. Such data may include, for example, flow volume, velocity, and depth, temperature, pH, or even content such as dissolved oxygen. Further examples of such screens and plots are described in the materials appended hereto, and made a part hereof, as Appendix A.

It is to be understood that the invention is not limited in its application to the details of construction and to the arrangements of the components set forth herein the following or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

What is claimed is:

1. A flow monitoring system, comprising:
   a first monitoring assembly having at least one sensor, wherein the at least one sensor is operative to detect data representative of actual flow volume of a fluid substance at a first location;
   a processor in communication with the first monitoring assembly;
   a memory, wherein the memory is operative to store the data representative of actual flow volume and a detection time associated with said data; and
   a central computing device in communication with the first monitoring assembly,
   wherein the processor is trained to compare the actual flow volume with a predicted flow volume to yield a difference value, the predicted flow volume being dependent upon the data stored in the memory and the detection time associated with said data.

2. The system of claim 1, wherein the processor is further trained to issue a notification if the difference value exceeds a predetermined variance amount.

3. The system of claim 1, wherein the data representative of actual flow volume comprises at least one of velocity data and depth data, and wherein the processor is further trained to calculate an actual flow volume corresponding to the at least one of velocity data and depth data.

4. The system of claim 1, further comprising an alarm device, the alarm device being integral with the processor, and the alarm device being configured to selectively issue an alarm based on the difference value.

5. The system of claim 4, wherein a current threshold value is computed on the basis of the predicted flow volume and the actual flow volume, the current threshold value being updated periodically, and wherein the alarm device is configured to issue an alarm when the actual flow volume is less than the current threshold value.

6. The system of claim 5, wherein when an alarm is issued by the alarm device, the first monitoring assembly is configured to communicate the alarm.

7. The system of claim 6, wherein the first monitoring system is configured to communicate the alarm via at least one of a cellular telephone means, a land line telephone means, a pager, an electronic mail means, and an Internet means.

8. The system of claim 1, wherein the processor is integral with the first monitoring assembly.

9. The system of claim 1, wherein the processor is integral with the central computing device.

10. The system of claim 1, wherein the first monitoring assembly is further operative to detect data representative of flow velocity and depth, and to validate the data representative of flow velocity and depth.

11. The system of claim 1, further comprising a means for detecting a quantity of rain at a location during a period of time.

12. The system of claim 11, wherein the means for detecting a quantity of rain includes at least one of a rain gauge, a weather service, and a weather web site.

13. The system of claim 1, wherein the central computing device is trained to predict at least one of an anticipated flow velocity, an anticipated depth, and an anticipated flow volume of the fluid substance at a second location.

14. An apparatus for monitoring and analyzing flow of a fluid substance in a sewer system, the apparatus comprising:
   a first means for monitoring fluid flow having at least one means for sensing, wherein the at least one means for sensing is operative to detect data representative of actual flow volume at a first location;
   a means for processing in communication with the first means for monitoring;
   a means for storing data, wherein the means for storing data is operative to store the data representative of actual flow volume and a detection time associated with said data; and
   a means for computing in communication with the first means for monitoring,
   wherein the means for processing is trained to compare the actual flow volume with a predicted flow volume to yield a difference value, the predicted flow volume being dependent upon the data stored in the means for storing data and the detection time associated with said data.

15. The apparatus of claim 14, wherein the means for processing is further trained to issue a notification if the difference value exceeds a predetermined variance amount.

16. The apparatus of claim 14, wherein the data representative of actual flow volume comprises at least one of velocity data and depth data, and wherein the means for processing is further trained to calculate an actual flow volume corresponding to the at least one of velocity data and depth data.

17. The apparatus of claim 14, further comprising a means for alarming, the means for alarming being integral with the means for processing, and the means for alarming being configured to selectively issue an alarm based on the difference value.

18. The apparatus of claim 17, wherein the means for processing is further trained to compute a current threshold value on the basis of the predicted flow volume and the actual flow volume and to periodically update the current threshold value, and wherein the means for alarming is configured to issue an alarm when the actual flow volume is less than the current threshold value.

19. The apparatus of claim 18, wherein when an alarm is issued by the means for alarming, the first means for monitoring is configured to communicate the alarm.

20. The apparatus of claim 19, wherein the first means for monitoring is configured to communicate the alarm via at least one of a cellular telephone means, a land line telephone means, a pager, an electronic mail means, and an Internet means.

21. The apparatus of claim 14, wherein the means for processing is integral with the first means for monitoring.

22. The apparatus of claim 14, wherein the means for processing is integral with the means for computing.

23. The apparatus of claim 14, wherein the first means for monitoring is further operative to detect data representative of flow velocity and depth, and to validate the data representative of flow velocity and depth.

24. The apparatus of claim 14, further comprising a means for detecting a quantity of rain at a location during a period of time.

25. The apparatus of claim 24, wherein the means for detecting a quantity of rain includes at least one of a rain gauge, a weather service, and a weather web site.

26. The apparatus of claim 14, wherein the mean for computing is trained to predict at least one of an anticipated flow velocity, an anticipated depth, and an anticipated flow volume of the fluid substance at a second location.

* * * * *